Figure 1:
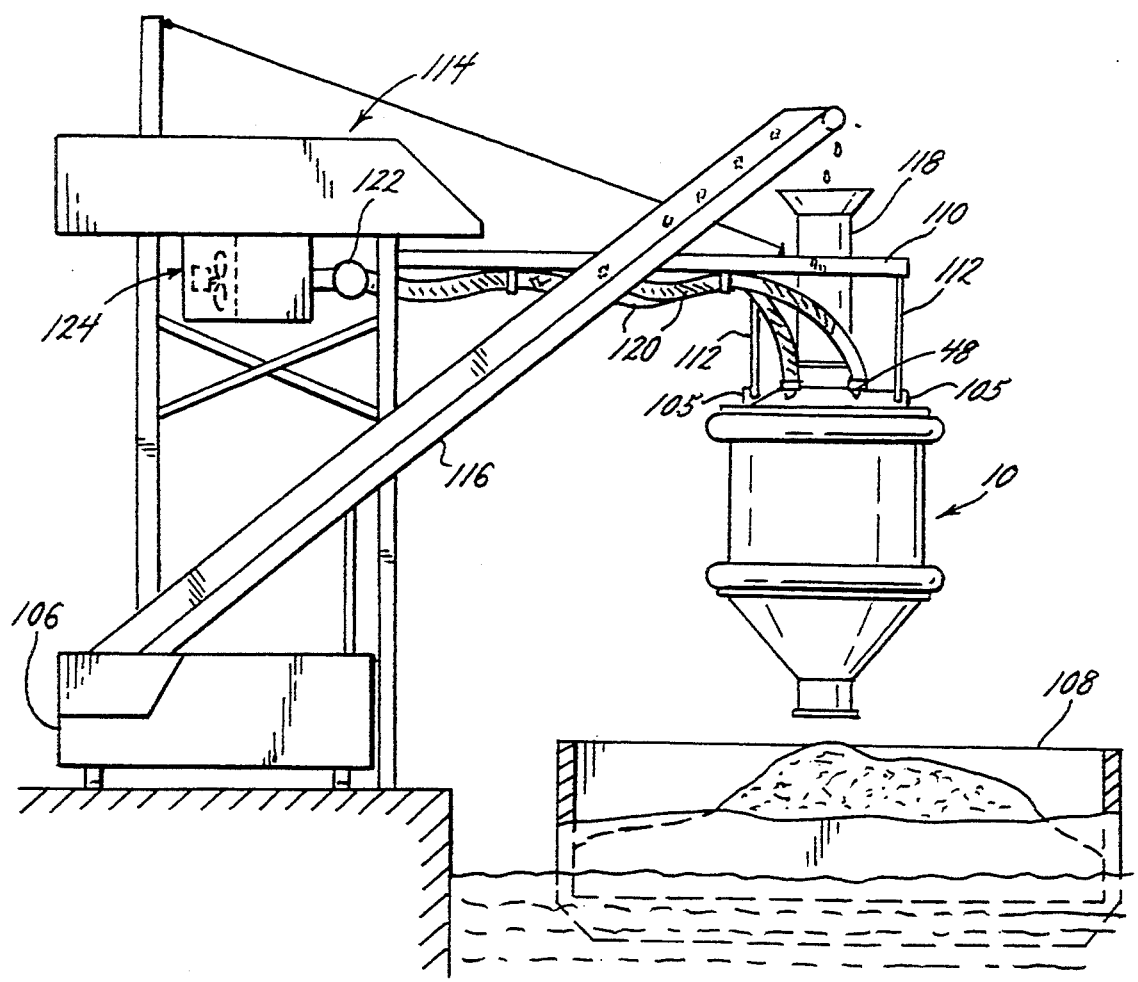

US005435442A

United States Patent [19]

Howell

[11] Patent Number: 5,435,442
[45] Date of Patent: Jul. 25, 1995

[54] DRY FLUID SUBSTANCE LOADING DEVICE

[75] Inventor: William A. Howell, Slidell, La.

[73] Assignee: Carl A. Dengel, New Orleans, La.

[21] Appl. No.: 14,197

[22] Filed: Feb. 5, 1993

[51] Int. Cl.[6] .......................... B07B 4/00; B01D 46/02

[52] U.S. Cl. ................................. 209/139.1; 209/143; 209/150; 55/341.1; 55/DIG. 26

[58] Field of Search ..................... 209/133, 138, 139.1, 209/142, 143, 146, 150; 55/302, 338, 334, 341.1, 374, 379, DIG. 26

[56] References Cited

U.S. PATENT DOCUMENTS

| | | | |
|---|---|---|---|
| 3,393,943 | 7/1968 | Kelly . | |
| 3,424,501 | 1/1969 | Young . | |
| 3,874,857 | 4/1975 | Hunt et al. | 55/379 X |
| 4,017,281 | 4/1977 | Johnstone | 55/334 |
| 4,058,455 | 11/1977 | Schier | 209/139.1 |
| 4,089,664 | 5/1978 | Noland | 55/374 X |
| 4,288,318 | 9/1981 | Essmann et al. | 209/139.1 |
| 4,298,360 | 11/1981 | Poll | 55/379 X |
| 4,336,041 | 6/1982 | Jolin | 55/356 X |
| 4,695,205 | 9/1987 | Levine | 55/338 X |
| 4,832,700 | 5/1989 | Kaspar et al. | 209/139.1 X |
| 4,844,665 | 7/1989 | Howell | 55/334 X |
| 4,988,240 | 1/1991 | Thompson . | |

FOREIGN PATENT DOCUMENTS

| | | |
|---|---|---|
| 2439716A1 | 8/1974 | Germany . |
| 57-34879 | 9/1983 | Japan . |

*Primary Examiner*—David H. Bollinger
*Assistant Examiner*—Tuan N. Nguyen
*Attorney, Agent, or Firm*—Rogers, Howell & Haferkamp

[57] ABSTRACT

A device which permits the conveyance of a dry fluid substance from one receptacle to another without the release of a significant amount of dust into the surrounding atmosphere is provided. The device is a housing with an interior volume divided into two sections and having an access opening and a discharge opening. A dry fluid substance is introduced into the device and into an inner chamber within the interior volume of the device which guides the substance from the access opening to the discharge opening and causes the separation of particulate matter from the substance. The particulate matter dispersed from the substance is drawn by a vacuum applied to the housing from the inner chamber into the filter chamber where the particulate matter is retained on a plurality of fine filter bag assemblies. At predetermined intervals, the vacuum applied to the device is shut off which causes the retained particulate matter to fall from the filter bags downwardly in the filter chamber through a pathway and discharged into the center of the stream of substance being discharged through the discharge opening. Thus, the particulate matter is reintroduced into the stream of substance at the point of discharge, but is delivered within the stream of substance which limits the creation of dust at the discharge point. In a preferred embodiment, the clean air chamber and filter chamber of the device are divided into quadrants and each quadrant is connected by a hose to the source of the vacuum. A valve positioned between the hose and the source of the vacuum permits the sequential closure of one section of the device while leaving the remaining sections open. This permits the particulate matter to be released from an individual section or sections of the device during the loading process. This can be regulated by conventional devices.

9 Claims, 6 Drawing Sheets

DRY FLUID SUBSTANCE LOADING DEVICE

BACKGROUND OF THE INVENTION

This invention relates, in general, to a device useful in the conveyance of a dry, fluid substance containing particulate matter from one receptacle to another and, more particularly, to a device adapted to direct the dry, fluid substance from a delivering receptacle into a receiving receptacle in a manner substantially reducing the amount of particulate matter released into the atmosphere during the delivery process while enabling the reintroduction of the particulate matter into the stream of substance being delivered into the receptacle.

Various industrial and commercial processes involve the conveyance of a dry, fluid substance from one receptacle to another. Oftentimes, the substance has particulate matter or "fines" associated with it which tend to be released into the atmosphere as a dust during the conveyance process, thereby polluting the surrounding environment. As is understood, this creates an undesirable and potentially hazardous environment in the vicinity surrounding the receiving receptacle, especially near the substance discharge point. The problem is particularly problematic when grain products are being conveyed from one receptacle to another because of the high levels of particulate matter associated with many grain products.

Conventionally, a substance, such as grain, is conveyed to a vessel, such as a barge, through a loading device and the dust created by the loading process at the discharge point is removed by being "vacuumed" into a dust collector located remotely from the discharge point. A hose connected at one end to the dust collector is typically coupled to the loading device so that the dust is removed as the substance is being loaded. The hose acts as a vacuum, with the negative air pressure created by a fan in the dust collector, to draw the dust from the discharge point to the dust collector. Because the particulate matter associated with grain is considered valuable and useful, it is typically collected in a hopper associated with the dust collector and reintroduced into the supply of grain being loaded. This reintroduction of grain dust into the supply of grain which already contains a significant amount of particulate matter creates a supply of grain that has an even higher concentration of particulate matter. This tends to create even more dust at the discharge point as the loading process continues. Therefore, in a conventional grain loading process the amount of particulate matter associated with the grain increases as the loading process proceeds because the grain dust is recirculated from the grain to the hopper, returned to the grain and so on creating a recirculating load of grain dust particles in the grain supply. In fact, some loading facilities have been forced to cease the loading of grain into the vessel and load only dust until the dust has been cleared from the system. The end result of such process is the release of more dust into the atmosphere.

For the foregoing reasons, there is a need for a device that can effectively reduce the amount of dust released into the atmosphere during the conveyance of a dry, fluid substance, such as grain, while also permitting the re-introduction of the collected particulate matter or dust into the stream of the substance being conveyed without recirculating the dust into the supply of substance yet to be conveyed.

SUMMARY OF THE INVENTION

The present invention is directed to a device that satisfies the need for an effective means for directing the flow of a dry, fluid substance containing particulate matter from one receptacle to another while reducing the amount of particulate matter being released into the atmosphere at or near the discharge point as dust. This device includes a housing having an interior volume divided by a partition into a clean air chamber and a filter chamber which is in communication with the clean air chamber, an access opening at one end for introducing the dry fluid substance into the interior volume of the housing and a discharge opening at a second end for discharging the substance from the housing. Within the interior volume of the housing is presented a conduit which guides the substance from the access opening to the discharge opening. Particulate matter is separated from the substance by a deflector member positioned within the conduit. A pathway permitting fluid communication between the conduit and the filter chamber is also provided in the conduit and the particulate matter separated from the substance in the conduit is drawn into the filter chamber by a negative pressure being applied to the device. Filter bag assemblies are contained within the filter chamber to collect and temporarily retain the particulate matter. In order to reintroduce the collected particulate matter into the substance, the particulate matter is released from the filter bags at timed intervals and discharged from the filter chamber through a discharge duct directly into the stream of substance flowing out the discharge opening. The particulate matter discharge ducts are designed so that the particulate matter is introduced into the center of the stream of substance flowing out of the housing thereby encapsulating these fine particles within the stream of substance. This substantially reduces the amount of dust created during the conveyance of the substance at the point of discharge.

Clean air outlet ports are presented on the exterior of the housing and are in communication with the clean air chamber. To cause the air and the separated particulate matter in the housing to flow from the interior conduit into the filter chamber, the clean air outlet ports are connected by hoses to a dust collector. The dust collector includes a fan which, when in operation, draws air through the hoses which creates a subatmospheric pressure within the interior volume of the housing. That is, a slight vacuum is applied to the interior volume of the housing to cause air to flow from the filter chamber, into the clean air chamber and out of the housing through the hose.

Therefore, a dry fluid substance is introduced into the loading device through the access opening and guided by the substance guiding conduit to contact the deflector member which causes the substance to be dispersed outwardly in the conduit which separates the particulate matter associated with the substance from the heavier substance particles. The heavier substance particles travel downwardly through the substance guiding conduit and are released through the discharge opening into the receiving vessel whereas the lighter particulate matter is drawn from the conduit into the filter chamber. The particulate matter is retained on the filter bags because of the negative pressure within the chamber. The filter bags permit air to flow through the bags and into the clean air chamber and back toward the dust collector, but the particulate matter is retained thereon.

At predetermined intervals, the source of vacuum to a section of the device is shut off which permits the particulate matter retained on the filter bags to be released from the bags. The particulate matter falls downward through the filter chamber into a pathway which channels the particulate matter into the center of the stream of substance being discharged from the housing. This collected particulate matter pathway is formed by the space between the substance guiding conduit and the lower portion of the exterior housing of the device. Preferably, the bottom section of the housing and the substance guiding conduit are conical which creates a conical pathway to concentrate the particulate matter flowing therethrough. In addition, interior guide plates are mounted to the interior face of the lower section of the housing in a manner further concentrating the particulate matter into a narrower stream and guiding the collected particulate matter into discharge ducts which deliver the particulate matter into the center of the stream of substance.

In a preferred embodiment, the clean air chamber and the upper portion of the filter chamber are divided into four discrete sections. A clean air outlet port is positioned in communication with each clean air chamber section and each is connected by a separate hose to the duct collector fan. A valve is positioned between each hose and the dust collector which enables each hose to be individually shut off at predetermined intervals. Thus, individual sections of the device can be shut off from the induced draft or vacuum of the dust collector allowing the retained particulate matter in that section to be released while the remaining sections continue to operate normally and continue to provide dust protection.

Among the many advantages of the present invention may be noted the provision of a dry fluid substance delivery device that enables the conveyance of a dry fluid substance from one receptacle to another in a manner greatly reducing the amount of particulate matter released into the atmosphere; the provision of such a device that efficiently re-captures the particulate matter and re-introduces it back into the substance in a substantially dust-free manner; and the provision of such a device that permits the continuous conveyance of a substance and the particulate matter associated therewith from one receptacle to another by collecting and temporarily retaining the particulate matter at a location near the discharge point and subsequently reintroducing the particulate matter into the stream of substance being conveyed in a substantially dust-free manner.

BRIEF DESCRIPTION OF THE DRAWINGS

FIG. 1 is a front elevation view of the loading device of the present invention in operation;

FIG. 2 is a schematic diagram showing the means by which the device is connected to the dust collector to enable sequential operation of the sections of the device;

FIG. 3 is a front elevation view of the loading device;

FIG. 4 is an enlarged top view partially cut away of the loading device;

FIG. 5 is a view in section of the lower portion of the loading device taken along the plane of the line 5—5 in FIG. 4;

FIG. 6 is a view in section of an enlarged scale of the upper right portion of the loading device taken along the plane of the line 6—6 in FIG. 4 and partially cut away;

FIG. 7 is a view in section on an enlarged scale taken along the plane of the line 7—7 in FIG. 6; and FIG. 8 is a view in section taken along the plane of the line 8—8 in FIG. 5.

DETAILED DESCRIPTION OF PREFERRED EMBODIMENTS

Referring initially to FIG. 3, a dry, fluid substance loading device of the present invention is denoted generally by the numeral 10. The device has a housing 12 comprising a substantially vertical cylindrical sidewall 14, an inverted conical top 16 and a conical bottom 18. The vertical cylindrical sidewall 14 has an upper flange 20 and a lower flange 22 for connecting the inverted conical top 16 and the conical bottom 18 to the sidewall 14, respectively. The conical top section 16 includes a flange 24 which, when aligned with the upper flange 20, permits conical top 16 to be connected to the vertical sidewall 20 by a plurality of bolts 26 extending through holes provided in the upper flange 20 and the flange 24. In a similar manner, the conical bottom 18 presents a flange 28 to permit coupling of the conical bottom 18 with the vertical sidewall 14. The conical bottom 18 is connected to the vertical sidewall 14 by a plurality of bolts 30 extending through holes provided in the lower flange 22 and the flange 28. The conical bottom 18 tapers downwardly to an opening 82 and terminates in a lower spout 19. By connecting the inverted conical top 16 and the conical bottom 18 to the vertical sidewall 14 by bolts 26 and 30, respectively, the inverted conical top 16 and the conical bottom 18 can be removed to provide access to the interior volume of the housing 12 for cleaning, or repair or the like.

As best illustrated in FIG. 6, a filter support plate 32 is presented, and secured by the bolts 26, between the upper flange 20 and the conical top flange 24, with seals provided by the neoprene gaskets 34. The filter support plate 32 divides the interior volume of the housing 12 into an upper clean air chamber 36 and a lower filter chamber 38. The purpose of these chambers will be described hereinafter.

The inverted conical top 16 tapers upwardly to an upper opening 39 into which a cylindrical tube 40 is inserted. As shown in FIG. 6, the tube 40 extends through the opening 39 in the inverted conical top 16 and through a like opening in the filter support plate 32 and into the interior volume of the housing 12. Therefore, the tube 40 extends through the clean air chamber 36 and partially into the filter chamber 38 of the housing 12. The tube 40 is secured to the inverted conical top 16 by a continuous weld 42 and to the filter support plate 32 by a continuous weld 44. The purpose of the tube 40 will be described hereinafter.

In a preferred embodiment, the clean air chamber 36 is divided into four discrete sections by the provision of four partition walls 46 extending from the outer surface of tube 40 to the inner surface of the inverted conical top 16. The partition walls 46 are preferably secured to the tube 40 and inner surface of the inverted conical top 16 by welds or brackets or the like. One of the partition walls 46 is shown in FIG. 6 and the configuration of the partition walls 46 within the clean air chamber 36 is shown in FIG. 4. The partition walls 46 establish four sections 47 of the clean air chamber 36. Referring to FIGS. 3 and 6, a clean air outlet port 48 communicating with the interior volume of clean air chamber 36 is presented in the inverted conical top 16. In a preferred embodiment, a clean air outlet port 48 is provided on inverted conical top 16 for each section 47 of the clean air chamber 36.

The filter chamber 38 formed within the interior volume of the housing 12 and below the filter support plate 32 is also preferably partitioned into a plurality of sections. As described for the clean air chamber 36, the filter chamber 38 is preferably partitioned into four sections 50 by filter chamber partition walls 52. The walls 52 are aligned substantially with the partition walls 46 to substantially correspond to the sections 47 in the clean air chamber 36 and the sections 50 of the filter chamber 38. Of course, various configurations of the sections of the respective chambers can be made. The walls 52 are secured at one end to the outer surface of tube 40 and at an opposite end to the inner face of sidewall 14. The walls 52 may also be mounted to the bottom face of filter support plate 32. The filter chamber partition walls 52 extend approximately half way into the interior volume of the housing 12.

Figure 4:
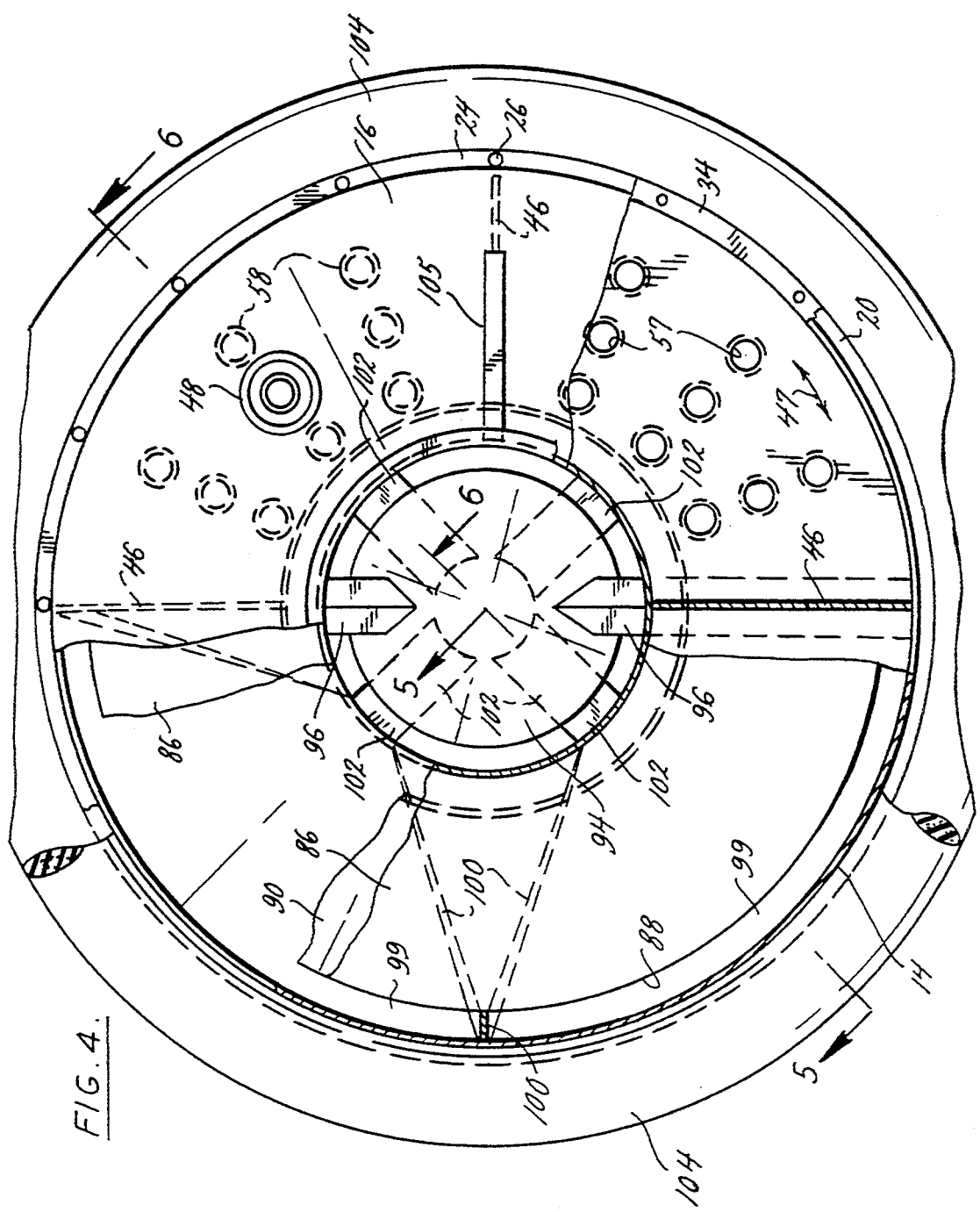
Figure 5:
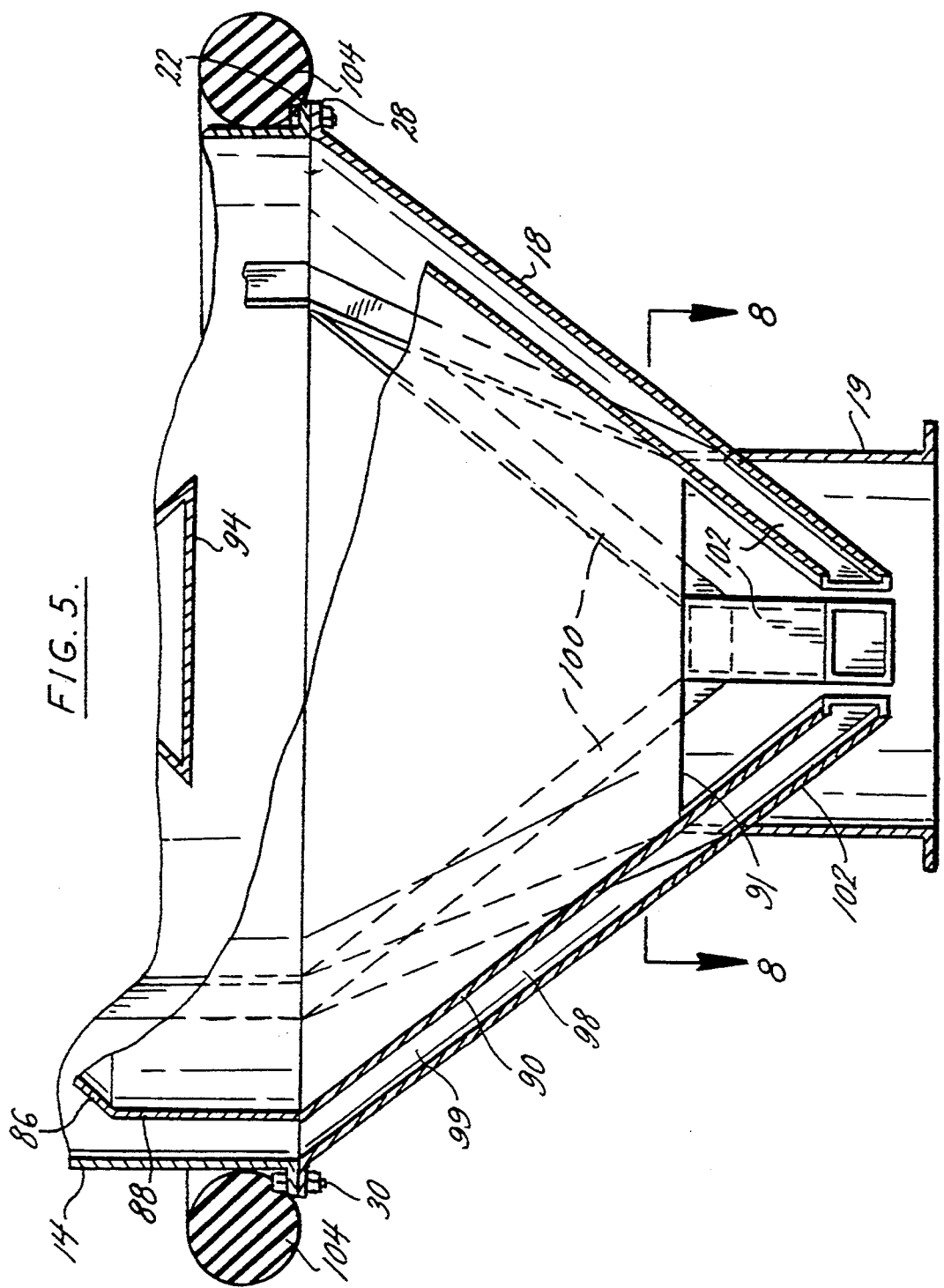
Figures 6, 7:
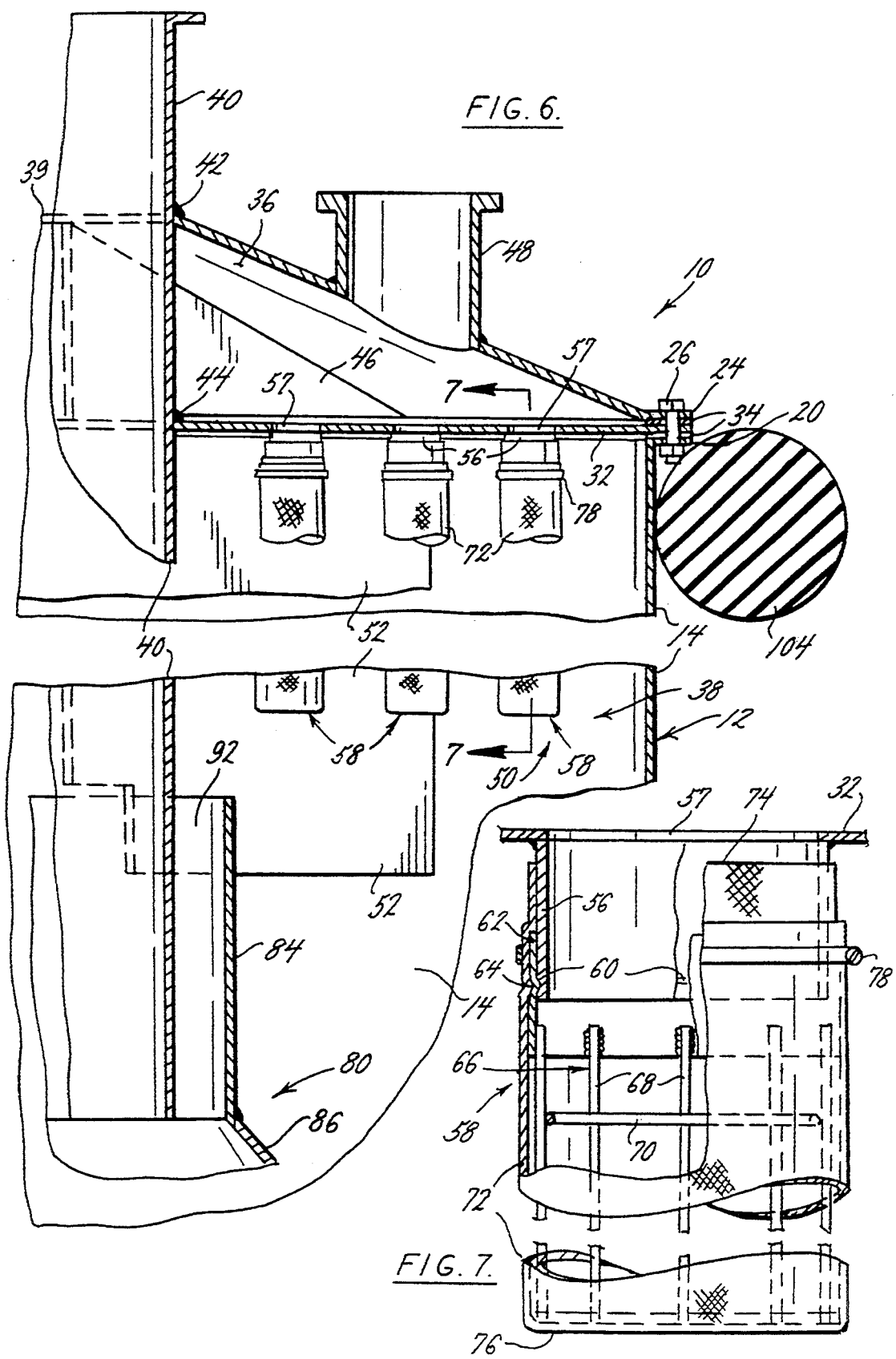
Figure 8:
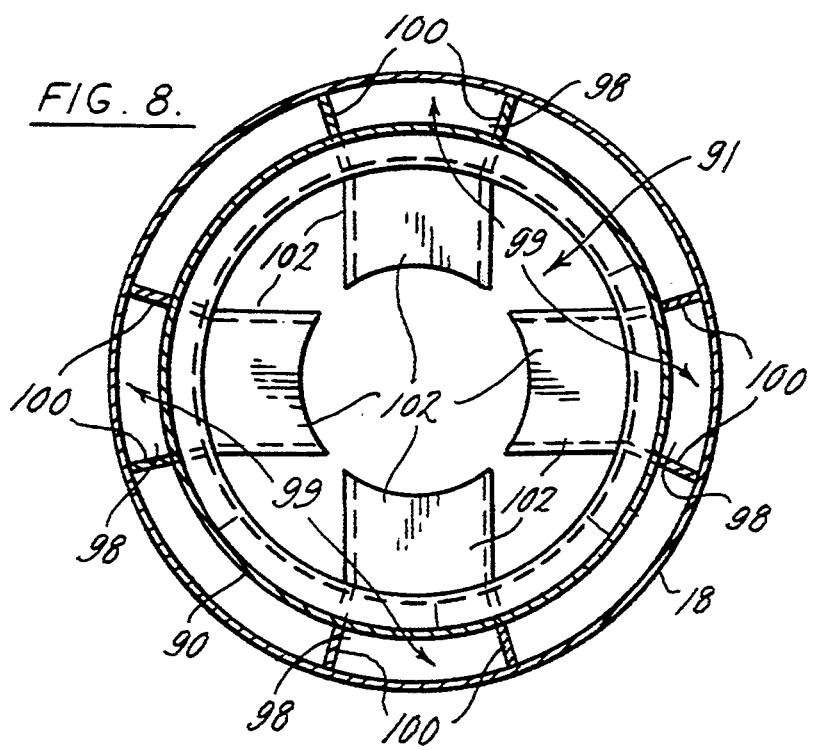

Also extending into the filter chamber 38 is a fine filter assembly 54 which is supported by the filter support plate 32. In that connection, the filter support plate 32 presents thirty-six holes 57 therethrough. As particularly shown in FIG. 4, these holes are arranged such that nine holes 57 are presented for each section of the clean air chamber 36 and the filter chamber 38. Surrounding each hole 57 is a short, downwardly-extending, cylindrical sleeve 56 that is welded to the filter support plate 32. Each short sleeve 56 supports a fine filter bag assembly 58. Each sleeve 56 has an annular groove 60 to facilitate mounting its respective bag assembly 58. The bag assembly 58 includes a sleeve 62 having an annular detent 64 that snaps within the annular groove 60. A wire frame 66 includes a plurality of vertical wires 68 and a plurality of horizontal wire rings 70 welded to the vertical wires 68 to shape the wire frame 66 in the general cylindrical orientation indicated in FIG. 7.

A filter sock 72 that may be of any conventional filtering medium is fitted over the wire frame 66 and about the sleeve 64. The filter sock 72 has an open upper end 74 and a closed lower end 76 so that air flowing through the sleeves 62 and through the holes 57 must first flow through the filter bag assemblies 58. A removable clamp 78 of conventional design is used to lock each filter bag assembly 58 in place.

For a housing 12 that is about 15 feet tall and 8 feet in diameter, each filter bag assembly 58 is preferably about 48 inches tall and about 4½ inches in diameter. The holes 57 in filter support plate 32 are preferably about 4¼ inches in diameter.

Located within the interior volume of the housing 12 and positioned below the fine filter assembly 54 is an inner housing 80 which guides the substance introduced into the interior volume of the housing through the tube 40. The walls 52 in the filter chamber 38 extend just below the top of inner housing 80. The inner housing 80 has a neck section 84, an inverted conical section 86, a vertical section 88 and a lower conical section 90 which tapers downwardly into an opening 91. The neck 84 of inner housing 80 is of a diameter greater than that of tube 40 and is positioned in an overlapping manner with respect to the lower end of tube 40. This overlapping relationship between neck 84 and the lower end of tube 40 creates an annular opening 92 which provides fluid communication between the interior volume of inner housing 80 and filter chamber 38. A conical deflector plate 94 is mounted within the interior volume of inner housing 80 by brackets 96 extending from the inner surface of the vertical section 88 of inner housing 80 to the deflector plate 94. The deflector plate 94 is positioned so as to be substantially aligned with the center of tube 40 such that substance introduced into tube 40 is directed onto the deflector plate as it enters the inner housing 80. As the substance contacts the deflector plate 94, the substance is dispersed outwardly creating a wider and less concentrated stream of substance within the inverted conical section 86 of inner housing 80 and the vertical section 88 of housing 80 which separates the particulate matter from the heavier particles of the substance being introduced. The heavier particles of the substance will continue to fall downwardly through the inner housing 80 into the lower conical section 90 whereas the lighter particulate matter will remain airborne and drawn into the filter chamber 38 through the annular opening 92 as will be described hereinafter.

The lower conical section 90 of inner housing 80 forces the heavier particles of the substance into a more concentrated stream because of the conical shape of the section. This forces unwanted excess air out of the substance as it is being released through discharge opening 91 into a receiving receptacle. The inner housing 80 can be mounted within the interior volume of housing 12 by conventional means such as by brackets (not shown) welded to the outer surface of vertical sidewall 88 of inner housing 80 and the inner surface of vertical sidewall 14 of housing 12. Preferably, four such brackets are used to mount inner housing 80 within housing 12.

As best shown in FIG. 5, a pathway 98 is formed between the lower conical section 90 of inner housing 80 and the conical bottom section 18 of housing 12. The pathway 98 is substantially continuous around the circumference of housing 12 except where the means mounting inner housing 80 are presented. As will be described hereinafter, the pathway 98 receives the particulate matter retained on the filter bag assemblies 58 and directs the particulate matter into the stream of substance being discharged through openings 91 and 82. As best shown in FIGS. 3–5, the pathway 98 is partitioned into four sections 99, substantially corresponding to the sections 50 of filter chamber 38, by eight internal guide plates 100 which serve to further concentrate the particulate matter flowing through the pathway 98. The internal guide plates 100 are welded to the outer surface of lower conical section 90 at one side and to the inner surface of bottom section 18 at an opposite side. As shown in FIG. 5, the internal guide plates 100 are positioned in a general "V" or pyramidal shape to direct the flow of particulate matter into ducts 102. As the preferred embodiment of the present invention provides four quadrants in filter chamber 38, four separate ducts 102 are provided to receive the particulate matter from each individual quadrant of filter chamber 38.

Although the housing 12 can be formed of various materials, abrasive resistant materials such as steel are preferred. In order to protect the housing 12 when in use, a pair of annular rubber bumpers 104 are mounted about the upper and lower end of the vertical sidewall 14. A pair of brackets 105 are also mounted to the outside surface of the inverted conical top 16 to provide a means for suspending the device 10 over a receptacle or vessel.

FIG. 1 is illustrative of a typical installation and use of the dry fluid substance loading device 10. In this example, a storage receptacle 106 contains a supply of a solid, dry fluid substance, such as grain or the like therein. A barge 108, or other receiving vessel at a delivery site, is positioned to receive the substance transferred from the storage receptacle 106. A dry, fluid substance loading device 10 is suspended from a traveling crane 110 by cables 112 connected to hanging brackets 105. The traveling crane 110 can be moved back and forth and up and down to facilitate an even distribution of the substance being conveyed through the loading device 10 into the barge 108. The crane 110 is secured to a platform 114.

Figure 2:
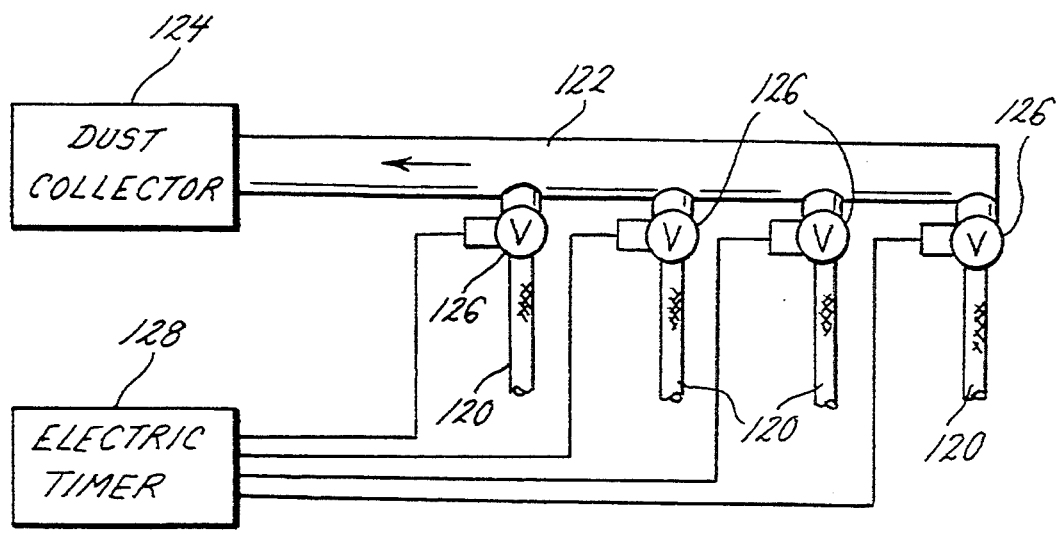
Figure 3:
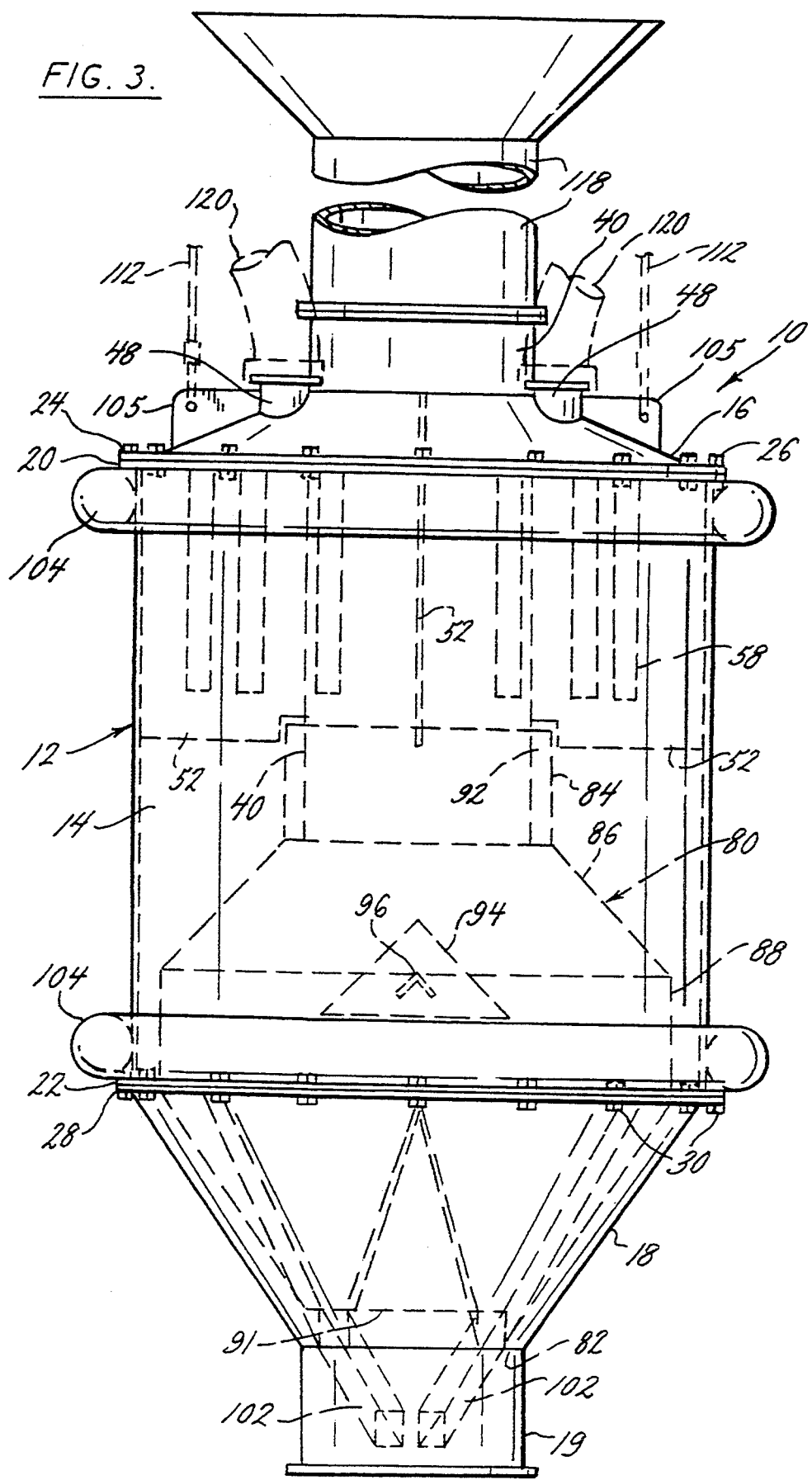

As shown in FIG. 1, the substance in storage receptacle 106 is conveyed by a conveyor 116 to the loading device 10. A telescoping spout 118 is attached to the upper end of tube 40 to facilitate introduction of the substance from the conveyor 116 into the loading device 10. The connection may be by any conventional means. A flexible hose 120 is connected between each of the clean air outlet ports 48 on the inverted conical top 16 and a manifold 122 which is connected to a conventional dust collector 124. The dust collector 124 has a fan or blower means incorporated therewith which, when in operation, creates a vacuum drawing air from the interior volume of loading device 10 through hoses 120 and into manifold 122 and ultimately dust collector 124. This creates a subatmospheric pressure within the interior volume of loading device 10 and clean air chamber 36 and filter chamber 38 in particular. Referring to FIG. 2, a valve 126 of conventional design is interposed between the manifold 122 and each of the hoses 120 to regulate the flow of air through the hoses 120. When the valve 126 is closed, no air is drawn through the respective hose 120 regulated by the particular valve 126. In the preferred embodiment of the present invention, there are four hoses 120, one for each section of the clean air chamber 36 connected to each of the four clean air outlet ports 48 and a separate valve 126 presented in the path of each of the hoses 120. Each of the valves 126 is connected to an electric timer 128 which permits the opening or closing of the flow of air through a hose 120 at timed intervals. In a preferred embodiment, the electric timer 128 is designed to permit sequential closing of the hoses 120 at timed intervals throughout the loading process. When one hose is closed, the remaining three hoses remain open to the flow of air therethrough.

Utilizing the present invention, the substance in storage receptacle 106 is conveyed by conveyor 116 and introduced into loading device 10 through telescoping spout 118. The stream of substance flows through tube 40 and falls onto deflector plate 94 which causes the stream of substance to be dispersed outwardly within the inner housing 80. This allows the air flow to separate the heavier substance particles from the lighter particulate matter or dust associated with the substance. The heavier particles continue to fall downwardly within inner housing 80 into lower conical section 90 of inner housing 80 and are discharged from the housing in a stream through discharge openings 91 and 82. This discharge stream is further guided by lower spout 19. Throughout the loading process, the fan of the dust collector 124 is inducing a draft within the interior volume of housing 12 which causes the lighter particulate matter dispersed in inner housing 80 to be drawn through annular opening 92 into filter chamber 38. As the particulate matter circulates among the fine filter bag assemblies 58, the particulate matter becomes collected on the outside of the filter socks 72 whereas the air flows through the socks 72 and through openings 57 into clean air chamber 36 and, ultimately, back to dust collector 124. Of course, substantially no dust is transferred back to the dust collector 124 as it is retained on the filter bag assemblies 58.

In order to release the particulate matter retained on the filter bag assemblies 58, the flow of air to a particular section of the interior volume of housing 12 is shut off by the respective valve 126 which releases the vacuum being applied within the housing and within the filter bag assemblies 58 located in that section of the filter chamber 38. This causes the particulate matter retained on the outside of the filter socks 72 to fall from the filter socks and into the particulate matter pathway 98. The particulate matter is then guided by internal guide plates 100 into the respective duct 102 which discharges the particulate matter into the center of the stream of substance flowing through discharge opening 82 so that the particulate matter is discharged with the substance into barge 108, but is encapsulated within the stream of substance so as to substantially reduce the creation of any dust at the point of discharge. The vacuum applied to the filter bag assemblies 58 in each individual section of the filter chamber 38 is sequentially shut off so that the particulate matter collected on the filter bags in each section of filter chamber 38 is sequentially reintroduced into the stream of substance being discharged. As air will seek the path of least resistance, it will tend to flow, and the particulate matter dispersed therein, through the section of filter chamber 38 in which the vacuum is still being applied.

There are various changes and modifications which may be made to the invention as would be apparent to those skilled in the art. These changes or modifications, however, are included in the teaching of the disclosure and it is intended that the invention be limited only by the scope of the claims appended hereto.

What is claimed is:

1. A device for conveying a supply of a dry fluid substance having particulate matter associated therewith, and separable therefrom, from one receptacle to another, the device comprising:

a housing having a interior volume, an access opening at one end for receiving the supply of substance in a stream therein and a discharge opening at a second end for discharging the substance therefrom;

the housing presenting a clean air chamber, a filter chamber, and a substance receiving chamber therein, the substance receiving chamber including means for enabling fluid communication between the substance receiving chamber and the filter chamber, and the filter chamber providing means enabling fluid communication between the filter chamber and the clean air chamber;

at least one clean air outlet port in communication with the clean air chamber presented on the exterior of the housing coupled to a means for applying a subatmospheric pressure within the interior volume of the housing;

the substance receiving chamber extending from the access opening to the discharge opening through the clean air chamber and the filter chamber and containing means for separating the particulate matter from the substance;

the filter chamber presenting filter means for collecting and temporarily retaining the particulate matter separated from the substance and means for discharging the retained particulate matter from the housing into a stream of substance being discharged at the discharging opening;

wherein the substance receiving chamber comprises a generally cylindrical conduit extending from the access opening through the clean air chamber and partially into the filter chamber, an inverted upper conical section having an opening with a diameter greater than the diameter of the cylindrical conduit and overlapping a lower end of the conduit creating an annular opening between the cylindrical conduit and the inverted conical section to permit fluid communication between the substance receiving chamber and the filter chamber, and a conical substance discharge section for directing the substance to the discharge opening.

2. The device as set forth in claim 1 wherein the particulate matter separating means comprises an inverted conical deflector member mounted within the inverted funnel section of the substance receiving chamber below the annular opening and in the path of the stream of substance being conveyed therein such that the substance contacts the deflector member and is dispersed outwardly in a manner separating the particulate matter therefrom.

3. The device as set forth in claim 2 wherein said filter means comprises a plurality of filter bag assemblies.

4. The device as set forth in claim 3 wherein the clean air chamber and the filter chamber further include partition walls separating each of the chambers into at least two discrete sections.

5. The device as set forth in claim 4 wherein a clean air outlet port is presented on the exterior of the housing for each discrete clean air chamber section.

6. The device as set forth in claim 5 wherein each of the discrete sections of the filter chamber is subjected to a subatmospheric pressure.

7. The device as set forth in claim 6 including means for individually interrupting the supply of subatmospheric pressure to each of the discrete sections of the filter chamber in a sequential manner for a duration sufficient to permit the release of the particulate matter retained on the filter bag assemblies sequentially from each filter chamber section.

8. The device as set forth in claim 7 wherein the particulate matter discharge means comprises at least one duct communicating with the filter chamber and enabling the conveyance of the collected particulate matter from the filter bag assemblies to the substance discharge opening.

9. The device as set forth in claim 8 wherein a plurality of the ducts are presented corresponding to the number of discrete sections of the filter chamber.

* * * * *